US008521991B2

(12) United States Patent
Wang et al.

(10) Patent No.: US 8,521,991 B2
(45) Date of Patent: Aug. 27, 2013

(54) REDUCING INSTRUCTION COLLISIONS IN A PROCESSOR

(75) Inventors: Kai-feng Wang, Beijing (CN); Hong-Xia Sun, Beijing (CN); Peng-fei Zhu, Beijing (CN); Yong-qiang Wu, Beijing (CN)

(73) Assignee: STMicroelectronics (Beijing) R&D Co., Ltd., Beijing (CN)

( * ) Notice: Subject to any disclaimer, the term of this patent is extended or adjusted under 35 U.S.C. 154(b) by 830 days.

(21) Appl. No.: 12/631,098

(22) Filed: Dec. 4, 2009

(65) Prior Publication Data

US 2010/0169616 A1 Jul. 1, 2010

(30) Foreign Application Priority Data

Dec. 31, 2008 (CN) .......................... 2008 1 0191060

(51) Int. Cl.
*G06F 9/30* (2006.01)

(52) U.S. Cl.
USPC ......................................... 712/214; 712/215

(58) Field of Classification Search
None
See application file for complete search history.

(56) References Cited

U.S. PATENT DOCUMENTS

| 5,627,982 | A * | 5/1997 | Hirata et al. | 712/206 |
| 6,105,127 | A * | 8/2000 | Kimura et al. | 712/215 |
| 6,449,710 | B1 * | 9/2002 | Isaman | 712/216 |
| 7,380,104 | B2 * | 5/2008 | Burky et al. | 712/214 |
| 7,484,077 | B2 * | 1/2009 | Lu et al. | 712/205 |
| 7,734,897 | B2 * | 6/2010 | Mansell | 712/23 |
| 2006/0095732 | A1 * | 5/2006 | Tran et al. | 712/217 |

OTHER PUBLICATIONS

Stark J, et al: "On pipelining dynamic instruction scheduling logic" MICRO-33. Proceedings of the 33rd Annual ACM/IEEE International Symposium on Microarchitecture, Monterey, CA., Dec. 10-13, 2000; {Proceedings of the Annual ACM/IEEE International Symposium on Microarchitecture}, Los Alamitos, CA: IEEE Comp. Soc, U, Dec. 10, 2000, pp. 57-66, XP010528875 isbn: 978-0-7695-0924-2.
S. Palacharla, N.P. Jouppi, J.E. Smith: "Quantifying the Complexity of Superscalar Processors" Technical Report CS-TR-96-1328, {Online} 1996, XP002574850 The University of Wisconsin, USA Retrieved from the Internet: URL: http://www.cs.wisc.edu/techreports/1996/TR1328.pdf [retrieved on Mar. 24, 2010].
European Search Report for European Patent Application No. 09180314.8-2211 dated Apr. 9, 2010.

\* cited by examiner

*Primary Examiner* — Eric Coleman
(74) *Attorney, Agent, or Firm* — Graybeal Jackson LLP

(57) ABSTRACT

A technique for selecting instructions for execution from an issue queue at multiple function units while reducing the chances of instruction collisions. In an embodiment, each function unit in a processor may include a selection logic circuit that selects a specific instruction from the issue queue for execution. In order to avoid instruction collision, a function unit may have a selection logic circuit that may select two instructions from an instruction queue: one according to a first selection technique and one according to a second selection technique. Then, by comparing the instruction selected by the first selection technique to the instruction selected by the selection logic circuit of another function unit, the instruction selected by the second technique may be used instead if there will be an instruction collision because the instruction selected by the first selection technique is the same as the instruction selected at a different function unit.

22 Claims, 6 Drawing Sheets

REDUCING INSTRUCTION COLLISIONS IN A PROCESSOR

PRIORITY

The present application claims the benefit of Chinese Patent Application Serial No. 200810191060.0, filed Dec. 31, 2008, which application is incorporated herein by reference in its entirety.

BACKGROUND

In computer architecture, a superscalar computer, i.e., a computer with multiple processing components that together may execute more than one instruction per clock cycle, may be used for computation-intensive applications. Often, superscalar computers will employ a central processing unit (CPU) that includes several execution resources, such as one or more function units, for executing multiple instructions simultaneously. Examples of a function unit may include an arithmetic logic unit, a bit shifter, or a multiplier. Executing multiple instructions with multiple function units simultaneously may allow faster overall CPU throughput than would otherwise be possible if instructions are executed one at a time with a single function unit.

With a CPU having multiple function units, each function unit may be associated with an instruction selection logic circuit that logically selects an instruction to be executed from a queue of instructions.

It may happen, however, that the selection logic for two different function units selects the same instruction for execution during the same cycle, i.e., at the same time. This situation is called an instruction collision, and may be wasteful of computational time and effort. Because multiple function units simultaneously executing a same instruction may cause a data error or another problem, the processor typically prohibits such simultaneous execution of an instruction. Therefore, when an instruction collision occurs, the processor selects one of the function units to execute the instruction, and causes all of the other function units that attempted to execute the instruction to instead execute a "no operation instruction" (NOP), which is effectively a wait state that typically serves no useful purpose.

BRIEF DESCRIPTION OF THE DRAWINGS

Embodiments of the subject matter disclosed herein will become more readily appreciated as the same become better understood by reference to the following detailed description, when taken in conjunction with the accompanying drawings.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the subject matter disclosed herein. This disclosure is not intended to be limited to the embodiments shown, but is to be accorded the widest scope consistent with the principles and features disclosed or suggested herein.

By way of overview, a method and system formed according to the subject matter disclosed herein may provide selection of instructions from an instruction-issue queue for execution at multiple function units while reducing the chances of instruction collisions that may result in the execution of a NOP instruction when more than one function unit attempts to execute the same instruction from the instruction-issue queue. In one embodiment, each function unit in a system may include an instruction-selection logic circuit that selects a specific instruction from the instruction-issue queue for execution. For example, each instruction-selection logic circuit may be realized according to a specific selection technique, e.g., an oldest-instruction-first technique, a technique based on the position/order of the instruction in the queue, etc., as described below. In order to avoid instruction collisions that result in the execution of NOP instructions, one or more function units may have an instruction-selection logic circuit that may select two instructions from an instruction issue queue: one according to a first selection technique and one according to a second selection technique. Then, the instruction selected by, e.g., the first instruction-selection technique may be compared to the instruction selected by the instruction-selection logic circuit of another function unit. If these two instructions are different, then no collision will occur and each selected instruction may be executed at the respective function unit. However, after comparison, if these two instructions are identified as the same instruction, then the second instruction selected at the second function unit by the second instruction-selection technique may be executed by the second function unit so as to avoid the identified instruction collision, and thus the execution of a NOP instruction by the second function unit. These and other aspects are described in greater detail below.

Figure 1:
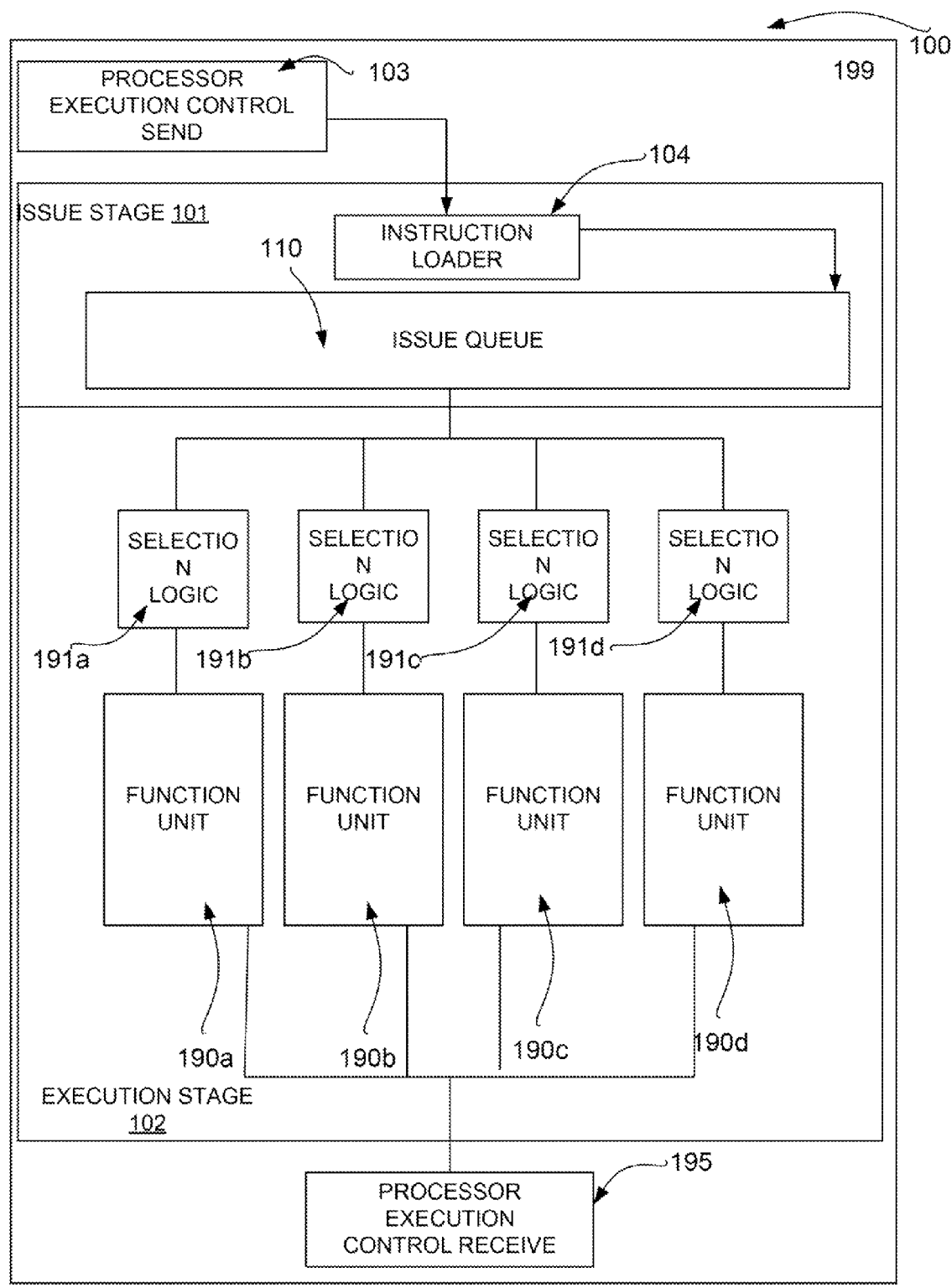
FIG. 1 is a diagram of a processor that is operable to reduce instruction collisions when executing instructions with multiple function units according to an embodiment of the subject matter disclosed herein.

FIG. 1 is a diagram of a processor 100 that is operable to reduce instruction collisions when simultaneously executing instructions on multiple function units according to an embodiment of the subject matter disclosed herein. Generally speaking, the processor 100 may control the flow of instructions, both to and from, execution resources, such as, for example, functions units 190*a*-190*d* (although four function units are shown, the processor 100 may have fewer or more than four function units). Instructions may be sent to an issue stage 101 and execution stage 102 from an execution-control send unit 103, which may be part of the processor 100. To efficiently distribute instructions for execution by various execution resources (e.g., function units 190*a*-190*d*), instructions may be queued at the issue stage 101 until ready to be executed by the execution stage 102. After execution, the result of each executed instruction may then be returned to the execution-control receive unit 195 of the processor 100.

Within the issue stage 101, an instruction loader 104 may receive and sort instructions, and load the sorted instructions into an instruction-issue queue 110. The instruction-issue queue 110 acts as a buffer that effectively decouples the execution control send unit 103 from the function units 190a-190d (i.e., the execution stage 102). In one embodiment, the instruction-issue queue 110 may hold thirty-two instructions that are ready to be executed. Each storage location (not shown in FIG. 1) within the instruction-issue queue 110 may be referred to as a respective position in the instruction-issue queue 110, and may hold an instruction to be executed regardless of the size or nature of the instruction. When one (or more) instruction(s) are executed, a respective "hole" is created in the instruction-issue queue 110 in each of the specific positions in which an instruction was just executed. For example, if four function units 190a-190d execute four instructions from the issue queue 110, there may now be four holes (i.e., empty storage locations in the instruction-issue queue 110) where the instructions were most recently stored before execution.

The instruction loader 104 may typically include logic that determines which instructions to send to fill the various holes after one or more instructions have been executed. In one embodiment, appropriate ones of the remaining instructions may shift to the left to fill the hole(s), (leaving the four right-most positions empty, using the example above). The hole(s) on the right may then be filled with the next instruction (s) from the instruction loader 104. Alternatively, the shift may occur to the right or the remaining instructions in the instruction-issue queue 110 may not shift at all and the holes are simply filled from the next instructions from the instruction loader 104. Techniques for populating the instruction-issue queue 110 and filling position holes are discussed in more detail with respect to the embodiments of FIG. 2 below.

During an execution cycle, each function unit 190a-190d may select a specific instruction from the issue queue 110 for execution. To make a specific selection, each function unit 190a-190d may include selection logic 191a-191d that may determine which instruction from the instruction queue 110 to begin executing. The selection logic 191a-191d selects a specific instruction according to a selection technique that may be unique to each function unit 190a-190d. The selection technique may be realized in logic that may determine whether or not the function unit can actually execute a particular instruction. For example, a simple add function unit may only be operable to execute add and subtract instructions, while a multiplier function unit may be able to execute add and subtraction instructions as well as more complex multiplication instructions.

Furthermore, if the instruction-selection logic 191 determines that the corresponding function unit can execute more than one instruction in the instruction-issue queue 110, then the instruction-selection logic 191 also selects which of these instructions to execute. For example, there may be two add instructions in the instruction-issue queue 110 ready for execution such that the instruction-selection logic 191 selects one add instruction over the other add instruction for execution. How the selection logic 191 selects one instruction over the other is discussed below in conjunction with FIGS. 2-5.

As discussed above, when the instruction-selection logic 191 of two function units 190 each select the same instruction for execution during the same clock cycle, an instruction collision results. It is desirable, however, that the processor 100 avoid instruction collisions while executing an instruction with each of the multiple function units 190 during each instruction cycle. That is, it is desirable to avoid collisions without causing any of the function units 190a-190d to execute a NOP instruction. This has become increasingly important as the number of function units in a single processor is increased.

Figure 2:
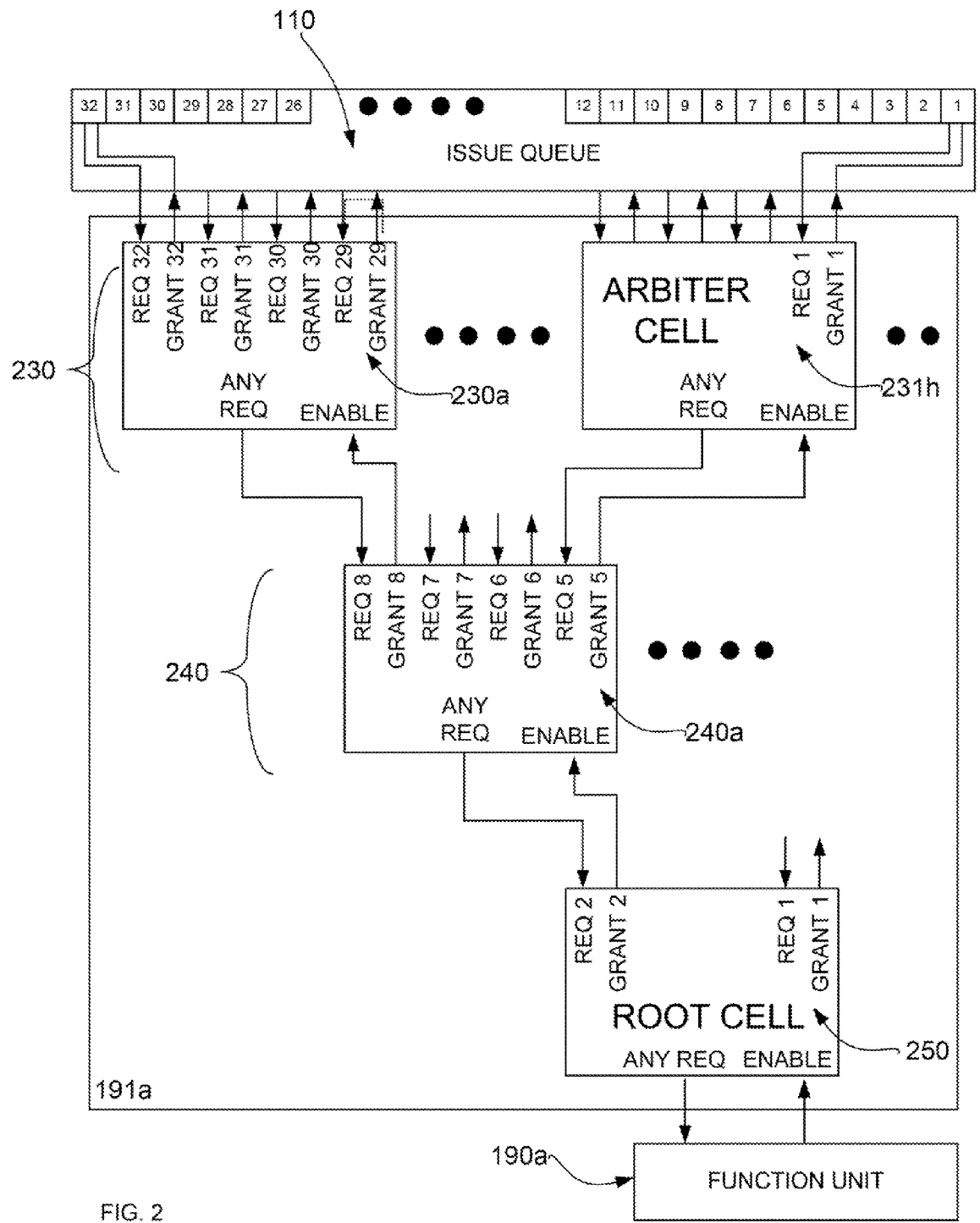
FIG. 2 is a diagram of a system for selecting an instruction from an instruction queue for execution at a function unit using a position-based selection technique
Figure 3:
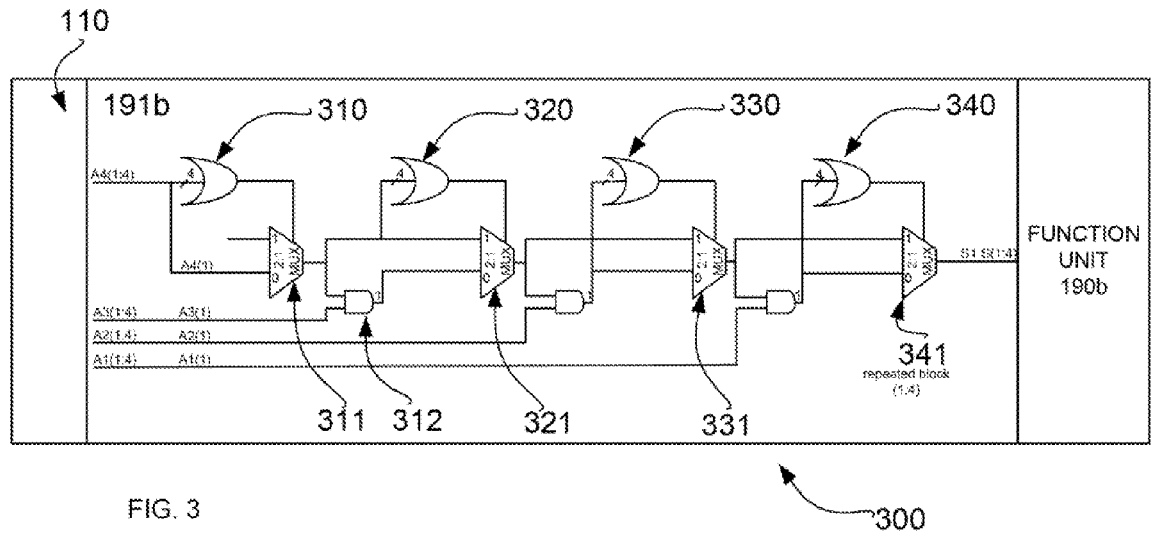
FIG. 3 is a diagram of a system for selecting an instruction from an instruction queue for execution at a function unit using an oldest-first selection technique.
Figure 4:
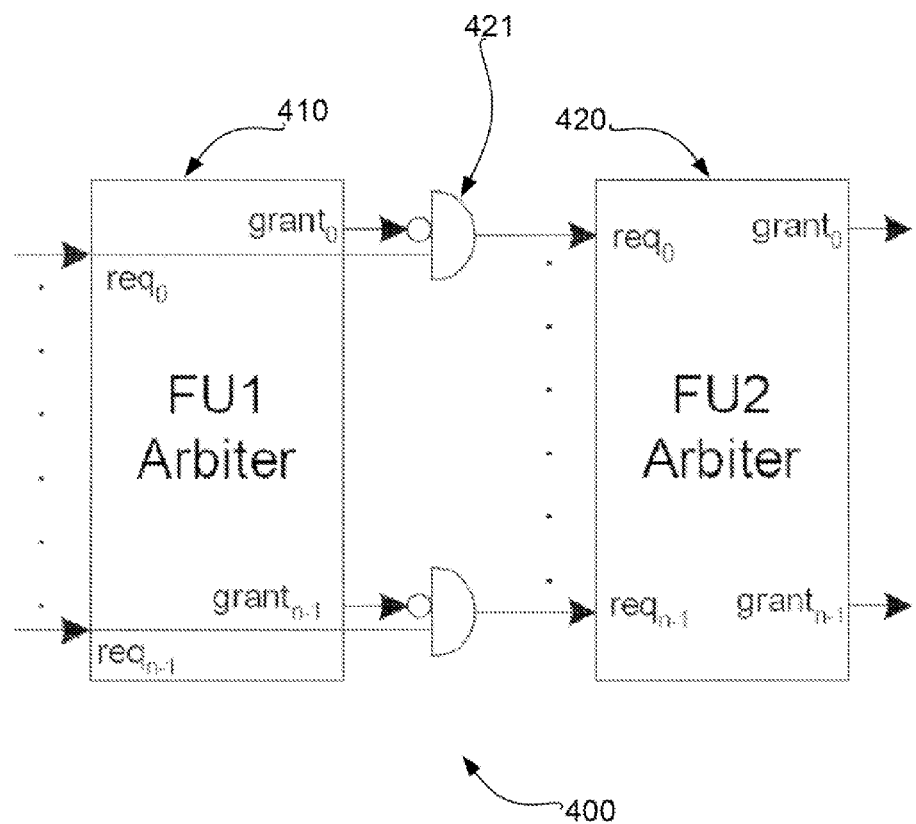
FIG. 4 is a diagram of additional selection logic for preventing instruction collisions when selecting instructions from an instruction queue for execution by two or more function units.
Figure 5:
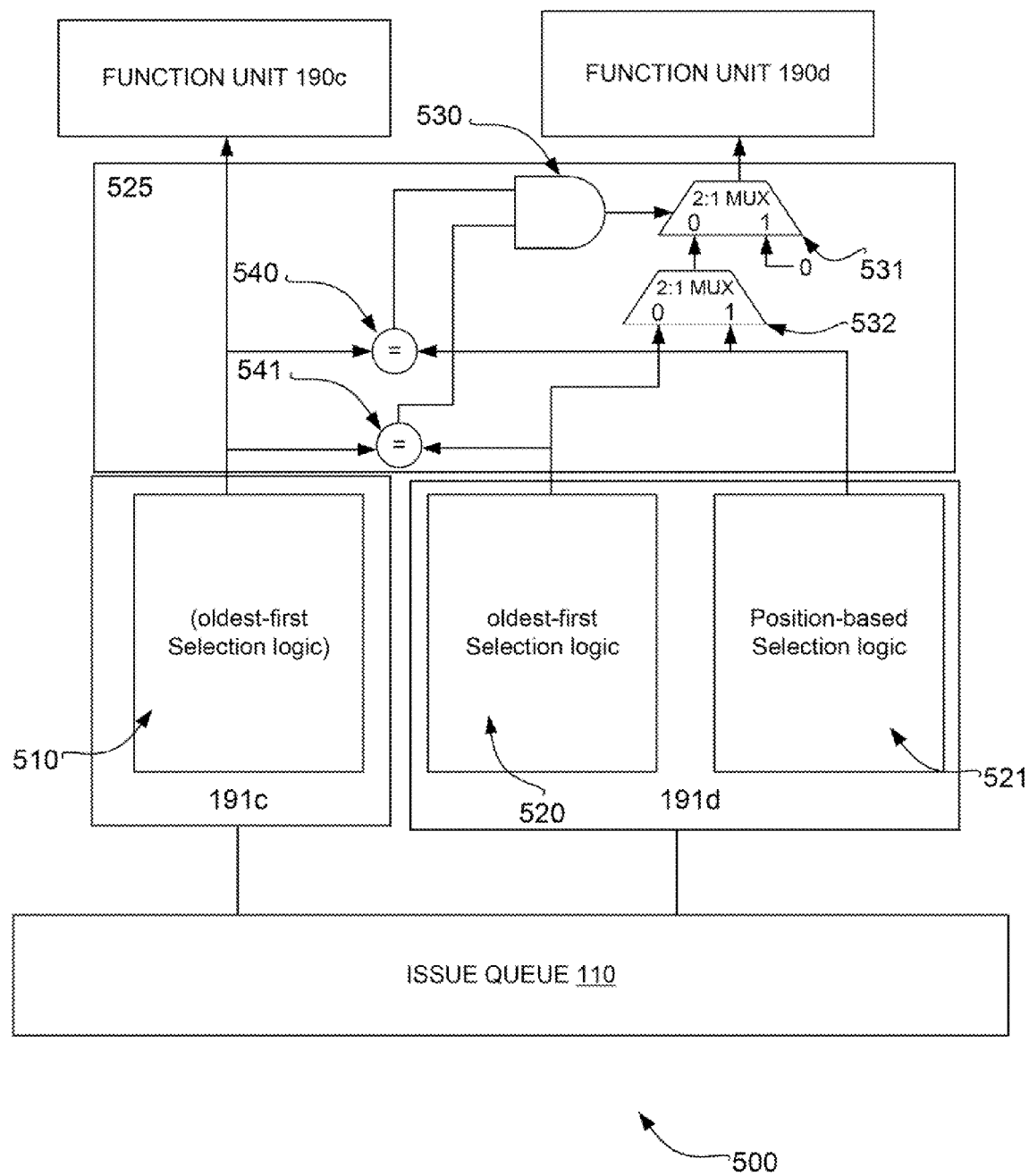
FIG. 5 is a diagram of a processor that includes selection logic for selecting instructions from an issue queue to be executed at a function unit, where the selection logic may reduce the chance that a function unit may execute a NOP instruction in response to an instruction collision according to an embodiment of the subject matter disclosed herein.

According to various embodiments disclosed herein, there may be one or more selection techniques used to select an instruction from the instruction-issue queue 110 for execution by a function unit 190. As described below, FIG. 2 shows an embodiment of a processor that uses a position-based selection technique, FIG. 3 shows an embodiment of a processor that uses an oldest-first selection technique, FIG. 4 shows additional logic that utilizes a priority-based technique to prevent instruction collisions, but in a manner that may consume an undesirable number of execution cycles, and FIG. 5 shows an embodiment of a processor that uses a combination of selection techniques. Throughout the following descriptions, reference numbers for similar components are used for clarity and illustrative purpose only.

FIG. 2 is a diagram of an embodiment of instruction-selection logic 191a for selecting instructions from the instruction-issue queue 110 for execution at the function unit 190a according to a position-based selection technique. Although the reference numbers used refer to the first function unit 190a and its associated instruction-selection logic 191a, the following descriptions may apply to any of the function units 190a-190d and respective instruction-selection logic circuits 191a-191d.

The selection logic 191a may implement a position-based selection technique, which may select the next available instruction ready for execution from the instruction-issue queue 110 according to its position (e.g., positions one through thirty-two) within the instruction-issue queue 110. This selection technique may be implemented using a series of cascaded arbiter cells (e.g., arbiter cells 230a, 230h, and 240a) that select instructions in a left-most hierarchical manner as discussed in the following paragraphs.

For example, the issue queue 110 may be populated with thirty-two instructions that are placed in position one through thirty-two, with "one" being the rightmost position and "thirty-two" being the left-most position. In this embodiment, instructions may be loaded from left to right such that instructions are shifted from right to left after holes are formed during execution of instructions. For example, at initialization, the first thirty-two instructions from the instruction loader (not shown in FIG. 2) may be loaded from left to right (i.e., the first-highest-priority) instruction is loaded to position thirty-two, the second-highest-priority instruction is loaded to position thirty-one, etc.). As instructions are executed, holes are filled by shifting remaining instructions to the left. For example, if one instruction is executed at position six, then the instructions that were in positions seven though thirty-two remain in the same positions and the instructions in position one through five shift to the left such that the instruction that was in position five shifts to position six, the instruction that was in position four shifts to position five, etc. And position one receives a new instruction from the instruction loader 104 (FIG. 1).

Each position (one through thirty-two) in the instruction-issue queue 110 may be coupled to two logical signal lines, a request line and a grant line, from one arbiter cell at a first arbiter-cell-level 230. Each arbiter cell (only the first 230a and last 230h are shown) in the first arbiter-cell-level 230 may be coupled to four instruction positions within the instruction-issue queue 110 via the tandem of request/grant lines.

For example, the arbiter cell 230a of the first-arbiter-cell level 230 is shown with four request bits (req 32, req 31, req 30, and req 29) (and four associated grant bits (grant 32, grant 31, grant 30, and grant 29). These tandems may be coupled uniquely to one instruction-issue queue 110 position. For example, position thirty-two may be coupled to req 32 and grant 32 of the arbiter cell 230a and position one may be coupled to req 1 and grant 1 of the arbiter cell 230h.

Each arbiter cell in the first arbiter-cell-level 230 also may include an enable line 231a and an any-request line 232a that may be coupled to a second arbiter-cell-level 240. The second arbiter-cell-level 240 may be similar to the first arbiter-cell-level 230 in that each arbiter cell (in this example there are two, but only the first arbiter cell 240a in the second level 240 is shown) in the second level 240 also may have four cell positions, each having a tandem of request/grant line (denoted in a similar manner). As such, the first tandem may be coupled to the enable line 231a and any-request line 232a of the first arbiter cell 230a. Finally, a root-level arbiter cell 250 may be coupled in a similar manner to each second level 240 arbiter cell.

When an instruction in the instruction-issue queue 110 is ready for execution, logic associated with the specific position (not shown in detail) may set its request line. Each arbiter cell in the first level may pass the left-most request line that is set to its any request line. In turn, each second-level arbiter cell passes its left-most request line to its respective any-request line. At the root level, again the left-most request line is passed to the function unit 190, which issues a grant signal if the function unit 190 is able to execute this instruction. If issued, the grant signal propagates back though the arbiter levels according to the pattern of set request lines. Then, using circuitry that is omitted from FIG. 2, the selection logic 191a passes the instruction associated with the grant signal to the function unit 190a for execution.

In this manner, the instruction in the left-most position within the instruction-issue queue 110 that is ready to be executed has priority to be executed next. As instructions are executed, each instruction in the instruction-issue queue 110 is shifted to the left to fill the hole left by the just-executed instruction.

With this position-based selection technique, one can understand that if two function units (e.g., function units 190a and 190b of FIG. 1) capable of executing a particular instruction and have the same instruction-selection logic (e.g., a position-based selection logic 191a and 191b) then there may be times when each function unit will select the same instruction for execution, thus causing an instruction collision. Of course, this is problematic as described above because the execution opportunity for executing a different instruction is wasted as the execution of the same instruction twice serves no useful purpose (and may cause an error), requiring at least one function unit (the "losing" function unit) to execute a NOP instruction while the other function unit (the "winning" function unit) executes the instruction.

FIG. 3 is a diagram of an embodiment of the selection logic 191b of FIG. 1 for selecting an instruction from an instruction-issue queue 110 for execution at a function unit 190b according to an oldest-instruction-first selection technique. In this selection technique, each instruction may also include a data field containing "age data" i.e., data related to how long the instruction has been in the instruction-issue queue 110. In one example, each instruction may include a four-bit age field indicating the number of execution cycles that an instruction has been in the instruction-issue queue 110. If an instruction is not selected for execution at a first execution cycle, then the first bit in the age field is set to one. Similarly, if the instruction is not selected for execution at a second execution cycle, then the second bit in the age field is set to one, and so on. In simple terms, the instruction with the largest age field value that is ready to execute has priority over others. Such an oldest-first selection technique may be accomplished with the selection logic 191b as discussed below.

In this selection logic, a first bit A4 of the age field of each instruction in the issue queue 110 may be coupled to a first OR gate 310 as well as coupled to an input of a first 2-to-1 multiplexer 311. If this first bit A4 is set to one, then the multiplexer 311 will pass the signal to an input of a first AND gate 312 as well as to a second input of a second multiplexer 321. If no other age field bit is set to one, then this signal propagates through each multiplexer 321, 331, and 341 to become the selection signal for the associated instruction. That is, because no other instruction is older (i.e., the second bit A3, the third bit A2 and the fourth bit A1 are all set to zero), the first available instruction with an age field having the first age field bit set to one will be selected for execution.

However, if another instruction has an age field wherein the second bit is set (indicating that this instruction is older), then the output of the first AND gate 312 is set to one and the selection signal associated with this instruction propagates through each multiplexer because the second multiplexer 321 is set by the output of the second OR gate 320. Again, if an instruction exists having its third and fourth age field bit set to one, then similar signal propagations occur involving the output of the third and fourth OR gates 330 and 340 along with the third and fourth AND gates 332 and 342. In this manner, the instructions having the most age field bits set will be selected before instructions with fewer age field bits set.

The selection logic 191b of FIG. 3 shows selection logic for handling an age field of up to four bits. Other embodiments are contemplated wherein each instruction includes an age field having more or fewer bits, such as having the same number of bits as there are positions in the issue queue. Thus, every instruction in the instruction-issue queue may necessarily have a unique age field value such that only one instruction may be selected and it will be the oldest. A thirty-two bit age field, however, may be too burdensome and a four-bit age field may be an appropriate tradeoff of accuracy for speed. Nonetheless, with only a four-bit age field, instruction collision may occur at an unacceptable rate.

In either of these two instruction-selection techniques as described above with respect to FIGS. 2 and 3, instruction collisions, and the problems that they may cause, may still occur when two function units having similar or identical selection logic select the same instruction to execute.

FIG. 4 is a diagram of additional selection logic for preventing instruction collisions when selecting an instruction from an instruction queue for execution at two or more function units. Each function unit (not shown in FIG. 4) may be associated with a respective arbiter (as well as instruction-selection logic as described in FIGS. 2 and 3) that provides priority to the function unit in a cascaded manner. In this simple example of FIG. 4 with two function unit arbiters 410 and 420, the first function unit arbiter 410 has priority. If the first function unit arbiter 410 receives a signal at req 0, the associated first function unit may or may not issue a grant at grant 0. If grant 0 is set to indicate that the first function unit has issued a grant of the request, then the AND gate 421 prevents the req 0 signal from propagating to the next function unit arbiter. If no grant signal is present, then the AND gate 421 allows the req 0 signal to be passed to the second arbiter 420 for possible execution. This relationship and logic may be repeated for as many function units as needed, thus preventing any possibility of instruction collision, because once one function unit grants the request to execute an instruction, the chain of arbiters, e.g., 410 and 420, prohibit any other function unit from executing the instruction.

However, the additional cascaded logic in the selection logic 400 of FIG. 4 introduces additional time delays because of the additional AND gates. Such additional time delays in selecting instructions for execution may prove to be too long, for example, for a processor operating at higher clock frequencies, such as, for example, 2 Ghz and above FIG. 5 is a diagram of a processor 500 that includes instruction-selection logic circuits for selecting instructions from an instruction-issue queue 110 to be executed at the function units 191c and 191d according to an embodiment of the subject matter disclosed herein. In this processor 500, instruction-selection logic 191c associated with a first function unit 190c may select instructions from the instruction-issue queue 110 according to a first selection technique 510. Furthermore, instruction-selection logic 191d associated with a second function unit 190d may select an instruction to execute from the instruction-issue queue 110 according to either a first selection technique 520 or a second selection technique 521. Additionally, the processor 500 includes selection logic 525 that causes the instruction-selection logic 191d to use a second selection technique 521 to select an instruction for execution at the second function unit 190d if both selection logic circuits 191c and 191b select the same instruction via the same selection technique (e.g., selection technique 510 and selection technique 520).

In one embodiment, the selection technique 510 of the instruction-selection logic circuit 191c may be an oldest-first selection technique as generally described above with respect to FIG. 2. Additionally, the first selection technique 520 of selection logic circuit 191d may also be an oldest-first selection technique. The second selection technique of the instruction-selection logic circuit 191d may be a position-based selection technique as generally described above with respect to FIG. 3. Other embodiments are contemplated wherein selection logic circuit 191d may include three or more selection techniques. Further, the selection technique 510 and selection technique 520, although shown in FIG. 5 as both being an oldest-first selection technique may, in fact, be different selection techniques with respect to each other. Further yet, other instruction-selection techniques that are different from and oldest-first or a position-based instruction-selection technique may be employed in any instruction-selection logic.

In operation, the first function unit 190c has priority for executing an instruction as selected by its instruction-selection logic circuit 191c according to its selection technique 510. For example, during an execution cycle, the instruction-selection logic circuit 191c may select the oldest instruction (as determined by an age field as described above) from the instruction-issue queue 110 for execution. This may be accomplished without regard to any selection made by the instruction-selection logic circuit 191d associated with the second function unit 190d.

When selecting an instruction for execution by the second function unit 190d, two different selection techniques 520 and 521 within the instruction-selection logic circuit 191d may select an instruction from the instruction-issue queue 110 at the same time. Only one of these selected instructions will be delivered to the second function unit 190d for execution. The logic circuit 525 provides for the exclusive selection of one or the other. Thus, if the instruction selected by the first instruction-selection technique 520 is also the same as the instruction selected by the instruction-selection technique 510 from the first function unit instruction-selection logic circuit 191c, then the logic circuit 525 causes selection by the second instruction-selection technique 521 to be used.

The logic circuit 525 utilizes an AND gate 530 having two inputs. The first input may be coupled to the output of a first comparator 541 that may compare the instructions selected by instruction-selection technique 510 and instruction-selection technique 520. If these selected instructions are the same, then the first input bit is set (i.e., set at a logic-high voltage signal). Similarly, the second input of the AND gate 530 may be coupled to the output of second comparator 540 that may compare instructions selected by the instruction-selection technique 510 and the instruction-selection technique 521. If these selected instructions are the same, then the second input bit is set. The output of the AND gate 530 may then be set if both inputs are set. This output may be used in conjunction with a pair of multiplexors 531 and 532 as described below.

The first of these multiplexors (i.e., multiplexor 532) may select one of two signals to pass depending on its selector input. The selector input of the first multiplexer 532 may be coupled to the output of the first comparator 541. The "0" input of the multiplexer 532 may be coupled to logic from the second instruction-selection technique 520 and the "1" input may be coupled to logic from the third instruction-selection technique 521. If the first comparator 541 output is set (e.g., the first 510 and second 520 instruction-selection techniques selected the same instruction) then the first multiplexor 532 passes an instruction selection by the third instruction-selection technique 521. Likewise, if the first comparator 541 output is not set (e.g., the first 510 and second 520 instruction-selection techniques selected different instructions) the multiplexer 532 passes an instruction selection by the second instruction-selection technique 520. The output of the first multiplexer 532 is then passed to the "0" input of the second multiplexer 531.

The second multiplexer 531 may be used so that the instruction selected by the third instruction-selection technique 521 is also not the same instruction as selected by the first instruction-selection technique 510. The selector input of the second multiplexer 531 may be coupled to the output of the second comparator 540. Thus, the second multiplexor 531 may be operable to pass the instruction passed by the first multiplexor 532 (e.g., the instruction selected by the third instruction-selection technique 521) if the output of the AND gate 530 is not set (i.e., the instructions selected by the first and third instruction-selection techniques 510 and 521 are not the same and the output of the second comparator 540 is not set). However, if these selected instructions are the same (i.e., the output of the AND gate 530 is set, indicating that all three selection instruction-selection techniques 510, 520, and 530 selected the same instruction) the multiplexer passes a NOP instruction to the function unit 190d.

In other embodiments, instead of passing a NOP through this input of the multiplexer 531, another cascaded multiplexor and comparator tandem (not shown may be used to allow a fourth instruction-selection technique and related logic (also not shown) to pass a selected instruction to the function unit 190d. Additional levels of instruction-selection technique logic are contemplated but not discussed further.

Figure 6:
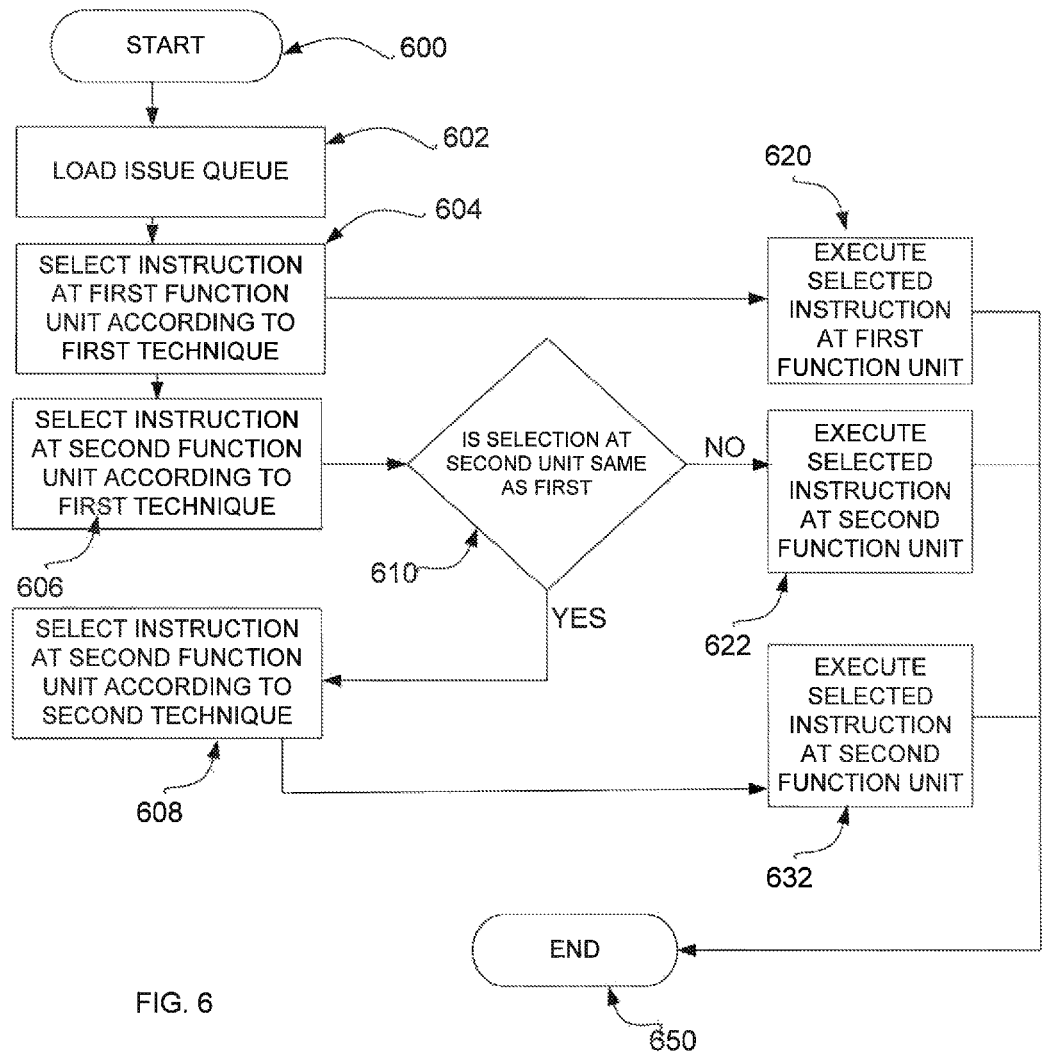
FIG. 6 is a flowchart of a method for selecting instructions for simultaneous execution at multiple function units according to an embodiment of the subject matter disclosed herein.

FIG. 6 is a flowchart of a method for selecting instructions for execution at multiple function units according to an embodiment of the subject matter disclosed herein. The method may start at step 600 as may be initiated by an overall processor control mechanism. An issue queue may be loaded with instructions at step 602. During a first initialization, every position in the instruction-issue queue may need to be populated. As instructions from the instruction-issue queue are selected out and executed, the holes (as described above) are filled with new instructions to be executed.

Next, three steps may occur simultaneously. An instruction to be executed at a first function unit may be selected via selection logic associated with the first function unit at step 604. Similarly and simultaneously, selection logic associated with a second function unit may also select an instruction according to a first instruction-selection technique at step 606. Again, simultaneously, at step 608, selection logic associated with the second function unit may also select an instruction according to a second instruction-selection technique.

To prevent an instruction collision, a comparison between the instruction selected by the instruction-selection logic associated with the first function unit and the instruction selected according to the first instruction-selection technique by the instruction-selection logic associated with the second function unit may be made. Then, an appropriate action may be taken to avoid an instruction collision based on the result. At decision step 610, this comparison may be made. At step 620, the instruction selected by the first function unit may be executed regardless of the comparison result at step 620. If the comparison at step 620 results in different instructions selected by the logic associated with the function units, then the second function unit also executes its selected instruction at step 622. However, if the comparison at step 620 results in the same instruction selected at both function units, then the instruction selected according to the second instruction-selection technique at the second function unit may be executed (instead of the first selected instruction). The method may then end at step 650 or return to step 602 to repeat the method.

In other embodiments, additional steps (not shown in FIG. 6) may compare the second instruction selected at the second function unit to the first instruction selected at the first function unit. In this respect, if the second selected instruction is also the same as the instruction selected at the first function unit, then a NOP instruction may be executed at the second function unit or a third instruction-selection technique may be employed to select yet another instruction that may be different than the instruction selected at the second function according to the first and second techniques.

In still further embodiments, the concept of the method of FIG. 6 may be expanded to include more than two function units. For example, a third function unit may compare its selection to the first function unit, the second function unit, or both. Similar decisions about using different instruction-selection techniques may be realized based on the comparison results at the third function unit.

Figure 7:
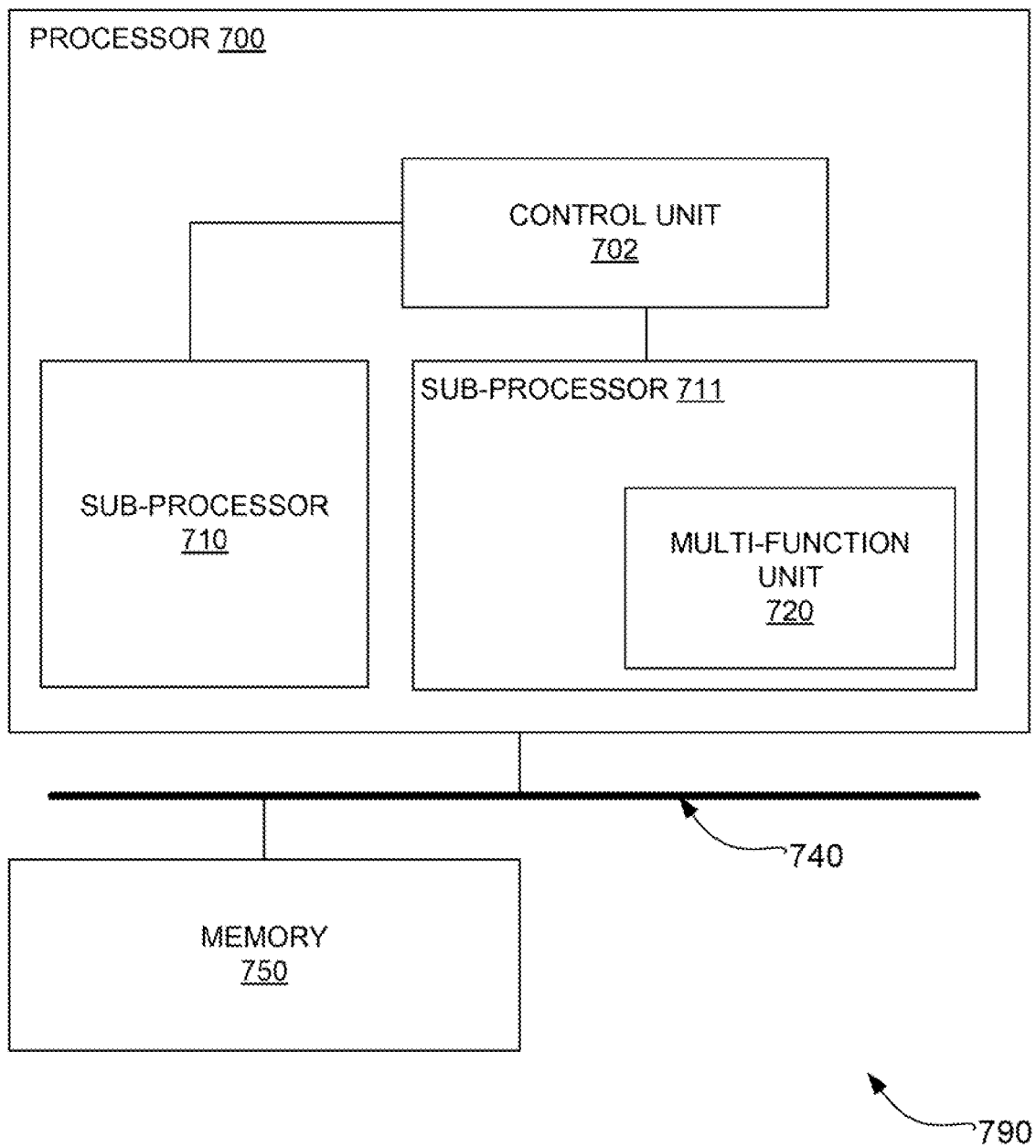
FIG. 7 is a diagram of a computing system that includes the processor of FIG. 5 according to an embodiment of the subject matter disclosed herein.

FIG. 7 is a diagram of a computing system 790 that includes the processor 500 of FIG. 5 according to an embodiment of the subject matter disclosed herein. In this computing system 790, a processor 700 may include more than one processing entity (e.g., pipeline processor and the like) such as pipeline processor 711. In this embodiment, the pipeline-processor 711 may include a multi-function unit 500 as generally described above with respect to FIG. 5. These processors 710 and 711 may be controlled by a processor control unit 702.

All of these components may collectively be coupled to a system bus 740 that may provide system communication to a memory 750 or a co-processor 760. One skilled in the art may appreciate that the various components described in FIG. 7 may comprise several inter-related chips or may be part of a single integrated circuit.

While the subject matter discussed herein is susceptible to various modifications and alternative constructions, certain illustrated embodiments thereof are shown in the drawings and have been described above in detail. Furthermore, those skilled in the art will understand that various aspects described in less than all of the embodiments may, nevertheless, be present in any embodiment. It should be understood, however, that there is no intention to limit the subject matter to the specific forms disclosed, but on the contrary, the intention is to cover all modifications, alternative constructions, and equivalents falling within the spirit and scope of the subject matter disclosed.

What is claimed is:

1. A processor, comprising:
   a first instruction-selection logic circuit configured to pass a first selected instruction to a first function unit and a second selected instruction to a second function unit; and
   a second instruction-selection logic circuit configured to pass a third selected instruction to the second function unit if and only if the second selected instruction is the same instruction as the first selected instruction.

2. The processor of claim 1 disposed on a single integrated circuit chip.

3. The processor of claim 1 wherein the first instruction-selection logic selects the instruction according to a first instruction-selection technique comprising one of: an oldest-first instruction-selection technique and a position-based instruction-selection technique.

4. The processor of claim 1 wherein the second instruction-selection logic circuit further comprises:
   instruction-selection logic for selecting an instruction according to a first instruction-selection technique;
   instruction-selection logic for selecting an instruction according to a second instruction-selection technique; and
   decision logic for passing an instruction to the second function unit for execution.

5. The processor of claim 4 wherein the first instruction-selection technique comprises an oldest-first instruction-selection technique and the second instruction-selection technique comprises a position-based instruction-selection technique.

6. The processor of claim 4, further comprising passing an instruction selected according to the first instruction-selection technique if and only if the selected instruction is different from the instruction selected by the first instruction-selection logic, otherwise passing an instruction selected according to the second instruction-selection technique.

7. A processor, comprising:
   a first instruction-selection logic circuit configured to pass a first selected instruction to a first function unit; and
   a second instruction-selection logic circuit configured to pass a second selected instruction to a second function unit if and only if the second selected instruction is different from the first selected instruction;
   wherein the second instruction-selection logic circuit further comprises:
   instruction-selection logic for selecting an instruction according to a first instruction-selection technique;
   instruction-selection logic for selecting an instruction according to a second instruction-selection technique; and
   decision logic for passing an instruction to the second function unit for execution; and
   wherein the second instruction-selection logic circuit further comprises instruction-selection logic for selecting an instruction according to a third instruction-selection technique and passing the instruction selected according to the third instruction-selection technique if and only if the instruction selected according to the first and second techniques are the same as the instruction selected by the first instruction-selection logic circuit.

8. A process, comprising:
a first instruction-selection logic circuit configured to pass a first selected instruction to a first function unit; and
a second instruction-selection logic circuit configured to pass a second selected instruction to a second function unit if and only if the second selected instruction is different from the first selected instruction;
wherein the second instruction-selection logic circuit further comprises:
instruction-selection logic for selecting an instruction according to a first instruction-selection technique;
instruction-selection logic for selecting an instruction according to a second instruction-selection technique; and
decision logic for passing an instruction to the second function unit for execution; and
wherein the decision logic further comprises:
an AND gate having two inputs wherein the first input is configured to be set if the instructions selected by the first and second instruction-selection logic circuits are the same and the second input is configured to be set if the instruction selected by the first and third instruction-selection logic circuits are the same;
a first multiplexor configured to pass an instruction selection by the second selection logic circuit if the instructions selected by the first and second instruction-selection logic circuits are not the same and configured to pass an instruction selection by the third instruction-selection logic circuits if the instructions selected by the first and second instruction-selection logic circuits are the same; and
a second multiplexor configured to pass the instruction passed by the first multiplexor if the output of the AND gate is not set and configured to pass a NOP if the output of the AND gate is set.

9. The processor of claim 1, further comprising:
an instruction-issue queue coupled to instruction-selection logic circuit; and
an instruction loader coupled to the instruction issue queue and configured to receive instructions from an execution control send module.

10. A non-transitory computer-readable storage medium having computer-executable instructions configured to:
store instructions at an issue queue;
select an instruction for execution at a first function unit according to a first instruction-selection technique;
select an instruction for execution at a second function unit according to a first instruction-selection technique;
determine that the instruction selected for execution at the first function unit and the instruction selected for execution at the second function unit are the same instruction; and
in response, select a different instruction for execution at the second function unit according to a second instruction-selection technique.

11. A method for executing instructions in a processor, comprising:
storing instructions in an instruction issue queue;
selecting an instruction from the instruction issue queue for execution at a first function unit using a first instruction-selection technique;
selecting an instruction for execution at a second function unit using the first instruction-selection technique, but if the instruction selected at the second function unit is the same instruction selected at the first function unit, then selecting an instruction for execution at the second function unit using a second instruction-selection technique; and
executing the selected instructions.

12. The method of claim 11, further comprising selecting the first instruction according to a first instruction-selection technique that is based upon reading an age field associated with each instruction and selecting an instruction having the largest age field value.

13. The method of claim 11, further comprising selecting the second instruction according to a second instruction-selection technique that is based upon a position in the instruction-issue queue.

14. The method of claim 11, further comprising selecting an instruction at a third function unit using the first instruction-selection technique, but if the instruction selected at the third function unit is the same instruction selected at the first function unit or second function unit, then selecting an instruction at the third function unit using the second instruction-selection technique.

15. The method of claim 11, further comprising selecting an instruction at the second function unit using a third instruction-selection technique if the instruction selected at the second function using the second instruction-selection technique is the same instruction selected at the first function unit.

16. The method of claim 11, further comprising:
executing each selected instruction at each function unit; and
loading instructions into the instruction-issue queue to replace the executed instruction.

17. A method for executing an instruction in a processor, comprising;
storing instructions in an instruction issue queue;
selecting an instruction from the instruction-issue queue for execution at a first function unit using a first instruction-selection technique;
selecting an instruction for execution at a second function unit using the first instruction-selection technique, and selecting an instruction for execution at the second function unit using a second instruction-selection technique; and
at the second function unit, if the instruction selected by the first instruction-selection technique is the same as the instruction selected for execution at the first function unit, then executing the instruction selected by the second instruction-selection technique.

18. A system, comprising:
a processor, comprising:
a first instruction-selection logic circuit configured to pass a first selected instruction to a first function unit and a second selected instruction to a second function unit; and
a second instruction-selection logic circuit configured to pass a third selected instruction to the second function unit if and only if the second selected instruction is the same instruction as the first selected instruction; and
an instruction-issue queue coupled to the first and second instruction-selection logic circuits; and
an integrated circuit coupled to the processor.

19. The system of claim 18 wherein the processor and the integrated circuit are disposed on the same integrated-circuit die.

20. The system of claim 18 wherein the system comprises a memory.

21. The system of claim 18 wherein the system comprises another processor.

22. The system of claim 18 wherein:

the processor is disposed on a first integrated-circuit die; and the integrated circuit is disposed on a second integrated-circuit die that is separate from the first integrated-circuit die.

\* \* \* \* \*